United States Patent

Chatterji et al.

[11] Patent Number: 6,059,036
[45] Date of Patent: May 9, 2000

[54] METHODS AND COMPOSITIONS FOR SEALING SUBTERRANEAN ZONES

[75] Inventors: Jiten Chatterji; Lewis R. Norman; David D. Onan; Bobby J. King, all of Duncan; Roger S. Cromwell, Walters, all of Okla.

[73] Assignee: Halliburton Energy Services, Inc., Duncan, Okla.

[21] Appl. No.: 08/979,435

[22] Filed: Nov. 26, 1997

[51] Int. Cl.$^7$ .......................... C04B 12/04; E21B 33/138
[52] U.S. Cl. .......................... 166/294; 106/605; 106/633; 106/634; 166/292; 166/330; 507/202; 507/269
[58] Field of Search .................... 166/292, 294, 166/300; 106/600, 605, 620, 621, 633, 634; 175/72; 405/263, 264, 266; 507/102, 140, 202, 269

[56] References Cited

U.S. PATENT DOCUMENTS

| | | | |
|---|---|---|---|
| 3,082,823 | 3/1963 | Hower . | |
| 3,435,899 | 4/1969 | McLaughlin et al. | 166/292 |
| 3,437,625 | 4/1969 | Bonnel et al. . | |
| 3,467,208 | 9/1969 | Kelly . | |
| 4,069,869 | 1/1978 | Sandiford | 166/270 |
| 4,215,001 | 7/1980 | Elphingstone et al. . | |
| 4,275,789 | 6/1981 | Lawrence et al. | 166/294 |
| 4,293,440 | 10/1981 | Elphingstone et al. | 405/266 X |
| 4,521,136 | 6/1985 | Murphey | 405/263 |
| 4,534,412 | 8/1985 | Dovan et al. | 166/300 X |
| 4,564,070 | 1/1986 | Norton | 166/300 X |
| 4,640,361 | 2/1987 | Smith et al. | 166/292 X |
| 4,676,318 | 6/1987 | Myers et al. | 166/293 |
| 4,741,401 | 5/1988 | Walles et al. | 166/300 |
| 4,797,003 | 1/1989 | Cameron et al. | 166/292 X |
| 4,799,549 | 1/1989 | Vinot et al. | 106/900 X |
| 5,220,960 | 6/1993 | Totten et al. | 166/293 |
| 5,320,171 | 6/1994 | Laramay | 166/292 X |
| 5,373,901 | 12/1994 | Norman et al. | 166/300 |
| 5,585,593 | 12/1996 | Villamagna et al. | 166/292 X |
| 5,588,489 | 12/1996 | Chatterji et al. | 166/292 X |
| 5,688,844 | 11/1997 | Chatterji et al. | 524/8 |

*Primary Examiner*—George Suchfield
*Attorney, Agent, or Firm*—Craig W. Roddy; C. Clark Dougherty, Jr.

[57] ABSTRACT

The present invention provides methods and compositions for sealing subterranean zones. The methods of the invention basically comprise the steps of preparing a sealing composition comprised of an aqueous alkali metal silicate solution, a gelling agent and a delayed acid activator for causing the composition to set into a rigid mass, placing the sealing composition in said subterranean zone and allowing the sealing composition to set into a rigid sealing mass therein.

28 Claims, No Drawings

METHODS AND COMPOSITIONS FOR SEALING SUBTERRANEAN ZONES

BACKGROUND OF THE INVENTION

1. Field of the Invention.

The present invention relates to improved methods and compositions for sealing subterranean zones.

2. Description of the Prior Art

In the drilling of oil and gas wells using the rotary drilling method, drilling fluid is circulated through the drill string and drill bit and then back to the surface by way of the well bore being drilled. The drilling fluid maintains hydrostatic pressure on the subterranean zones through which the well bore is drilled and circulates cuttings out of the well bore. During such drilling, subterranean vugs, fractures and other thief zones are often encountered whereby the drilling fluid circulation is lost and drilling operations must be terminated while remedial steps are taken. Also, when a subterranean zone is penetrated containing fluids under pressure which exceeds the hydrostatic pressure exerted on the zone by the drilling fluid, formation fluid crossflows and/or underground blow-outs can and often do occur.

Heretofore, a variety of compositions have been developed and used for combatting lost circulation, crossflow and underground blow-out problems. However, such compositions have often been unsuccessful due to delayed and inadequate viscosity development by the compositions. For example, a variety of compositions containing hydraulic cement or the like have been used in attempts to stop lost circulation. The lost circulation is usually the result of encountering weak subterranean zones that contain natural fractures or are fractured by drilling fluid pressures and rapidly break down. When a cement or other slow setting composition is squeezed into the zone, the delay in developing high viscosity allows the cement composition to be diluted and displaced into the zone whereby it bypasses the fractures and vugs causing the lost circulation. The same type of problem often occurs when cross-linked hydrated gels and other similar plugging compositions are utilized.

Thus, there are needs for improved methods and compositions for sealing subterranean zones whereby the compositions have high viscosity when placed and simultaneously or very shortly thereafter set into rigid masses which effectively seal the subterranean zones.

SUMMARY OF THE INVENTION

Improved methods and compositions for sealing subterranean zones are provided which meet the above described needs and overcome the deficiencies of the prior art. The methods of the invention for sealing subterranean zones are basically comprised of the steps of preparing a sealing composition comprised of an aqueous alkali metal silicate solution, a gelling agent for increasing the viscosity of the solution and a delayed activator for polymerizing or cross-linking the alkali metal silicate and causing the composition to set into a rigid sealing mass. The delayed activator can be a delayed acid polymerization activator such as an ester or a powdered acid coated with a temporary coating which degrades with time or temperature, or both, or the delayed activator can be an alkaline-earth metal salt which delayingly dissolves and causes the alkali metal silicate to set by cross-linking the alkali metal silicate.

Once prepared, the gelled, but unset sealing composition is placed in a subterranean zone or zones to be sealed thereby. Thereafter, the sealing composition is caused to set into a rigid sealing mass by the delayed activator. When lower density properties are required than those provided by the above described unfoamed composition or when large cavernous subterranean zones are encountered which must be sealed, the sealing composition can be foamed in the presence of foam forming and stabilizing surfactants. Additionally the sealing composition can include extending and/or bridging agents as required to provide a seal in the larger zones.

A preferred sealing composition of the present invention is comprised of an aqueous sodium silicate solution, a cross-linked polyacrylate gelling agent and a delayed acid polymerization activator for polymerizing the sodium silicate and causing the composition to set into a rigid mass. The delayed acid activator is comprised of an ester or a powdered solid acid such as citric acid or tartaric acid coated with a temporary polymer, elastomer, wax or other coating which degenerates with time or temperature or both. As mentioned above, the composition can be foamed and/or extended when necessary to provide enhanced sealing properties.

The delayed activator allows the sealing composition to be placed in a subterranean zone to be sealed before setting into a rigid sealing mass. The delay can be controlled so that the sealing composition immediately sets after being placed in the subterranean zone to be sealed and dilution and/or displacement of the composition out of the zone do not take place.

The sealing compositions of this invention are simple to prepare, low in cost and have long service lives at high temperatures. The methods of the invention are simple to carry out since the viscous sealing compositions can be made to remain pumpable for desired periods of time before setting into rigid masses.

It is, therefore, a general object of the present invention to provide improved methods and compositions for sealing subterranean zones.

Other and further objects, features and advantages of the invention will be readily apparent to those skilled in the art upon a reading of the description of preferred embodiments which follows.

DESCRIPTION OF PREFERRED EMBODIMENTS

As mentioned above, in the drilling of wells, subterranean zones are often encountered which contain high incidences of natural vugs and fractures. As a result, drilling fluid circulation is often lost which requires the termination of the drilling and the implementation of remedial procedures which are often of long duration and high cost. Such remedial procedures have heretofore involved the placement of hardenable compositions such as Portland cement compositions or cross-linked stiff gels and the like in the lost circulation zone. However, as mentioned above, because such compositions require considerable time to harden or gel, successful plugging of the zone often does not take place. In addition to drilling fluid lost circulation zones, zones containing pressurized fluids can be encountered which cause gas, oil or water crossflows that dilute and wash away sealing compositions. Also, underground blow-outs at low to high formation fluid flow rates can take place.

The present invention provides improved methods and compositions for sealing subterranean zones and terminating the loss of drilling fluid, crossflows and/or underground blow-outs. The methods of the present invention for sealing a subterranean zone basically comprise the steps of preparing a viscous set delayed sealing composition of this invention, placing the sealing composition in a subterranean zone to be sealed and allowing the sealing composition to set into a rigid sealing mass therein.

The sealing compositions of this invention are basically comprised of an aqueous alkali metal silicate solution, a gelling agent for increasing the viscosity of the solution and a delayed activator for polymerizing or cross-linking the alkali metal silicate and causing the sealing composition to set into a rigid sealing mass. As mentioned above, in applications involving a need for a low density sealing composition or where a large cavernous subterranean zone is encountered which must be sealed, the sealing composition can be foamed to form an energized and expanding sealing composition. The non-foamed and foamed compositions can also include extending and/or bridging agents to facilitate filling and sealing a zone.

A variety of alkali metal silicates can be utilized in accordance with the present invention. For example, sodium silicate, potassium silicate, lithium silicate, rubidium silicate and cesium silicate can all be used. Of these, sodium silicate is preferred, and of the many forms in which sodium silicate exists, those having an $Na_2O$ to $SiO_2$ weight ratio in the range of from about 1:2 to about 2:4 are most preferred. A particularly preferred commercially available aqueous sodium silicate solution for use in accordance with this invention is an aqueous sodium silicate solution having a density of about 11.67 pounds per gallon, and a $Na_2O$ to $SiO_2$ weight ratio of about 1:3.22. This aqueous sodium silicate solution is commercially available from various vendors as Grade 40 sodium silicate and contains about 9.1% $Na_2O$, 29.2% $SiO_2$ and 61.7% water, all by weight of the solution.

A variety of gelling agents can be utilized for increasing the viscosity of the alkali metal silicate solution. Because of the high pH of an alkali metal silicate solution, some gelling agents function better in the solutions than others. Those which are preferred include cross-linked polymers derived from acrylic acid such as polyacrylate, polymethacrylate and the like. Of these, cross-linked polyacrylate is the most preferred. Particularly suitable cross-linked polyacrylate gelling agents are commercially available under the trade designations "CARBOPOL 940™" or "CARBOPOL 941™" from the B.F. Goodrich Company, Chemical Group, of Akron, Ohio.

Generally, the gelling agent utilized is included in a sealing composition of this invention in an amount in the range of from about 0.5% to about 3% by weight of the alkali metal silicate solution therein including when the alkali metal silicate solution is a Grade 40 sodium silicate solution. When the gelling agent is the above described cross-linked polyacrylate, it is included in the sealing composition containing Grade 40 sodium silicate solution in an amount of about 1% by weight of the sodium silicate solution therein.

Various delayed activators for polymerizing the alkali metal silicate and causing the sealing composition to set into a rigid mass can be utilized. For example, if the required time delay between when the sealing composition is prepared and when it sets is relatively short, any of various esters which undergo hydrolysis in the presence of water and form acids can be used. Examples of suitable such esters are triethyl citrate, ethyl acetate and ethyl glutamate. Of these, triethyl citrate is preferred.

When a longer time delay is required such as when the sealing composition is being pumped into a deep well bore, a solid acid in powdered form having a temporary coating thereon which degenerates with time or temperature or both can be used. Examples of particularly suitable such acids are citric acid, tartaric acid and gluconic acid. The acids can be coated with various materials which degenerate with time and/or temperature such as elastomers, petroleum waxes or one of the coating materials described in U.S. Pat. No. 4,741,401 issued to Walles, et al. on May 3, 1988 and U.S. Pat. No. 5,373,901 issued to Norman, et al. on Dec. 20, 1994, both of which are incorporated herein by reference. Elastomers such as ethylene-propylene-diene terpolymer (EPDM) when coated on acid such as citric acid delay the reaction of the acid with the alkali metal silicate for a time period in the range of from about 3 hours to about 6 hours at temperatures as high as about 350° F. Petroleum waxes which melt at different temperatures can be utilized in the same manner. For example, tartaric acid coated with a petroleum wax which melts at about 300° F. can be utilized to delay the reaction of the acid in a well having a bottom hole temperature of about 250° F. for a time period in the range of from about 3 hours to about 6 hours.

A delayed activator which cross-links the alkali metal silicate and causes it to set into a rigid three dimensional structure can also be utilized. Such delayed activators include alkaline-earth metal solids like alkaline-earth metal salts which slowly dissolve and release alkaline-earth metal ion, e.g., calcium or magnesium chloride.

Generally, the delayed acid or alkaline-earth metal solid activator used is present in the sealing composition in an amount in the range of from about 1% to about 5% by weight of the aqueous alkali metal silicate solution therein.

In applications where a foamed sealing composition is required, the gelled aqueous alkali metal silicate sealing composition containing a delayed activator described above can be foamed with a gas in the presence of foam forming and form stabilizing surfactants prior to placing the composition in a subterranean zone to be sealed. The gas utilized to form the foam can be air or nitrogen with nitrogen being preferred. Generally, the gas utilized is included in the foam in an amount sufficient to form a foamed aqueous alkali metal silicate composition having a density in the range of from about 8 to about 10.5 pounds per gallon.

A variety of surfactants can be utilized to facilitate the formation of the foam. A preferred such surfactant is comprised of an ammonium sulfonated and ethoxylated hydrocarbon compound of the formula $$H(CH_2)_a(OC_2H_4)_bSO_3NH_4^+$$

wherein a is an integer in the range of from about 6 to 10 and b is an integer in the range of from about 3 to 10. A surfactant of this type is commercially available under the trade name "HOWCO SUDS™" from Halliburton Energy Services of Duncan, Okla. Generally, the foam forming surfactant is included in the composition in an amount in the range of from about 1.5% to about 3.5% by weight of the aqueous alkali metal silicate solution therein.

Various foam stabilizing surfactants which function to stabilize and prevent the foam from deteriorating after it is initially formed can also be used. A preferred such foam stabilizer is comprised of an amidopropylbetaine of the formula $$R\text{—}CONHCH_2CH_2CH_2N^+(CH_3)_2CH_2CO_2^-$$

wherein R is a cocoyl radical. A surfactant of this type is commercially available under the trade name "HC-2™"

from Halliburton Energy Services of Duncan, Okla. Generally, the foam stabilizing surfactant is included in the composition in an amount in the range of from about 0.5% to about 2.5% by weight of the alkali metal silicate solution therein.

When necessary or advantageous, the sealing compositions can include extending and/or bridging agents. Examples of such agents include, but are not limited to, sand, walnut hulls, gilsonite and any of various fibers.

A particularly preferred sealing composition of this invention which can be unfoamed or foamed is comprised of a Grade 40 aqueous sodium silicate solution, a cross-linked polyacrylate gelling agent present in the composition in an amount of about 1% by weight of the sodium silicate solution therein and a delayed acid polymerization activator comprised of a triethyl citrate ester or an acid selected from the group of citric acid and tartaric acid having a temporary coating thereon which degenerates with time or temperature or both selected from polymers, elastomers and waxes, the delayed acid activator being present in the composition in an amount of about 1% by weight of the sodium silicate solution therein.

In forming the sealing compositions of this invention, the aqueous alkali metal silicate solution used is placed in a mixer and the gelling agent and delayed activator are combined therewith. After sufficient mixing, the resulting gelled sealing composition is pumped into a subterranean zone where the sealing composition is to be placed and allowed to set. If the sealing composition is to be foamed, the foam forming and foam stabilizing surfactants can be injected into the pumped sealing composition on-the-fly along with the gas used whereby the foam is formed as the composition is pumped to the location to be sealed.

In order to further illustrate the methods and compositions of this invention, the following example is given.

EXAMPLE

A sodium silicate sealing composition is prepared comprised of a Grade 40 aqueous sodium silicate solution, a cross-linked polyacrylate gelling agent present in the composition in an amount of about 1% by weight of the sodium silicate solution therein and a delayed acid polymerization activator comprised of a triethyl citrate ester present in the composition in an amount of about 1% by weight of the sodium silicate solution therein.

The sealing composition is foamed on-the-fly as it is pumped with nitrogen in the presence of a foam forming surfactant (Halliburton "HOWCO SUDS™") present in the composition in an amount of about 1.5% by weight of the sodium silicate solution therein and a foam stabilizing surfactant (Halliburton "HC-2™") present in the composition in an amount of about 0.75% by weight of the sodium silicate solution therein. The resulting foamed sealing composition is pumped into a subterranean zone to be sealed wherein it is allowed to set into a highly durable and rigid sealing mass within minutes after it reaches the zone.

Thus, the present invention is well adapted to carry out the objects and advantages mentioned as well as those which are inherent therein. While numerous changes may be made to the invention by those skilled in the art, such changes are encompassed within the spirit of the invention as defined by the appended claims.

What is claimed is:

1. A method of sealing a subterranean zone penetrated by a well bore comprising the steps of:

(a) preparing a sealing composition comprised of an aqueous alkali metal silicate solution, a gelling agent selected from the group consisting of polyacrylate and polymethylacrylate for increasing the viscosity of said solution and a delayed activator for polymerizing or cross-linking said alkali metal silicate and causing said composition to set into a rigid sealing mass;

(b) placing said sealing composition into said subterranean zone by way of said well bore; and (c) allowing said sealing composition to set into a rigid sealing mass therein.

2. The method of claim 1 wherein said alkali metal silicate is sodium silicate.

3. The method of claim 1 wherein said aqueous alkali metal silicate solution is a Grade 40 sodium silicate solution.

4. The method of claim 4 wherein said gelling agent is cross-linked polyacrylate present in said composition in an amount in the range of from about 0.5% to about 3% by weight of said aqueous alkali metal silicate solution therein.

5. The method of claim 1 wherein said delayed activator is an ester selected from the group consisting of triethyl citrate, ethyl acetate and ethyl glutamate.

6. The method of claim 1 wherein said delayed activator is an acid selected from the group consisting of citric acid, tartaric acid and gluconic acid having a temporary coating thereon which degenerates with time or temperature or both.

7. The method of claim 6 wherein said coating is selected from the group consisting of elastomers and waxes.

8. The method of claim 1 wherein said delayed activator is an alkaline-earth metal salt which releases alkaline-earth metal ion that cross-links said alkali metal silicate.

9. The method of claim 1 wherein said delayed acid activator is present in said composition in an amount in the range of from about 1% to about 5% by weight of said aqueous alkali metal silicate solution therein.

10. The method of claim 1 which further comprises the step of foaming said sealing composition with a gas in the presence of foam forming and foam stabilizing surfactants prior to carrying out step (b).

11. The method of claim 10 wherein said gas is selected from the group consisting of air and nitrogen.

12. The method of claim 10 wherein said foam forming surfactant is comprised of an ammonium sulfonated and ethoxylated compound of the formula

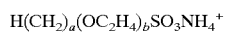

wherein a is an integer in the range of from about 6 to 10 and b is an integer in the range of from about 3 to 10, and said foam stabilizing surfactant is comprised of an amidopropylbetaine of the formula

wherein R is a cocoyl radical.

13. A method of sealing a subterranean zone penetrated by a well bore comprising the steps of:

(a) preparing a pumpable sealing composition comprised of an aqueous sodium silicate solution, a cross-linked polyacrylate gelling agent present in said composition in an amount of about 1% by weight of said sodium silicate solution therein and a delayed acid polymerization activator for polymerizing said sodium silicate and causing said composition to set into a rigid mass, said delayed acid polymerization activator being comprised of a trimethyl citrate ester or an acid selected from the group consisting of citric acid and tartaric acid having a temporary coating thereon selected from the group consisting of polymers, elastomers and waxes which degenerate with time or temperature or both and being present in said composition in an amount of about 1% by weight of said sodium silicate solution therein;

(b) pumping said sealing composition into said subterranean zone to be sealed by way of said well bore; and (c) allowing said sealing composition to set into a rigid sealing mass therein.

14. The method of claim 13 wherein said aqueous alkali metal silicate solution is a Grade 40 sodium silicate solution.

15. The method of claim 13 which further comprises the step of foaming said sealing composition with a gas in the presence of foam forming and foam stabilizing surfactants prior to carrying out step (b).

16. The method of claim 15 wherein said gas is selected from the group consisting of air and nitrogen.

17. The method of claim 15 wherein said foam forming surfactant is comprised of an ammonium sulfonated and ethoxylated compound of the formula $$H(CH_2)_a(OC_2H_4)_bSO_3NH_4^+$$

wherein a is an integer in the range of from about 6 to 10 and b is an integer in the range of from about 3 to 10, and said foam stabilizing surfactant is comprised of an amidopropylbetaine of the formula $$R-CONHCH_2CH_2CH_2N^+(CH_3)_2CH_2CO_2^-$$

wherein R is a cocoyl radical.

18. A sealing composition comprising:

(a) an aqueous alkali metal silicate solution;

(b) a gelling agent selected from the group consisting of polyacrylate and polymethylacrylate for increasing the viscosity of said solution present in said composition in an amount in the range of from about 0.5% to about 3% by weight of said alkali metal silicate solution therein; and (c) a delayed activator for polymerizing or cross-linking said alkali metal silicate and causing said composition to set into a rigid mass present in said composition in an amount in the range of from about 1% to about 5% by weight of said alkali metal silicate solution therein.

19. The composition of claim 18 wherein said alkali metal silicate is sodium silicate.

20. The composition of claim 18 wherein said aqueous alkali metal silicate solution is a Grade 40 sodium silicate solution.

21. The composition of claim 18 wherein said gelling agent is cross-linked polyacrylate.

22. The composition of claim 18 wherein said delayed activator is an ester selected from the group consisting of trimethyl citrate, ethyl acetate and ethyl glutamate.

23. The composition of claim 18 wherein said delayed activator is an acid selected from the group consisting of citric acid, tartaric acid and gluconic acid having a temporary coating thereon which degenerates with time or temperature or both.

24. The composition of claim 23 wherein said coating is selected from the group consisting of polymers, elastomers and waxes.

25. The composition of claim 18 wherein said delayed activator is an alkaline-earth metal salt which releases alkaline-earth metal ion that cross-links said alkali metal silicate.

26. The composition of claim 22 wherein said sealing composition is a foam composition formed by foaming said sealing composition with a gas in the presence of foam forming and foam stabilizing surfactants.

27. The composition of claim 26 wherein said gas is selected from the group consisting of air and nitrogen.

28. The composition of claim 26 wherein said foam forming surfactant is comprised of an ammonium sulfonated and ethoxylated compound of the formula $$H(CH_2)_a(OC_2H_4)_bSO_3NH_4^+$$

wherein a is an integer in the range of from about 6 to 10 and b is an integer in the range of from about 3 to 10, and said foam stabilizing surfactant is comprised of an amidopropylbetaine of the formula $$R-CONHCH_2CH_2CH_2N^+(CH_3)_2CH_2CO_2^-$$

wherein R is a cocoyl radical.

* * * * *